(12) United States Patent
Feng

(10) Patent No.: US 9,995,227 B2
(45) Date of Patent: Jun. 12, 2018

(54) APPARATUS AND METHOD FOR USING NEGATIVE PRESSURE ENERGY OF ENGINE

(71) Applicant: Beiqi Foton Motor Co., Ltd., Beijing (CN)

(72) Inventor: Lei Feng, Beijing (CN)

(73) Assignees: Belqi Foton Motor Co. Ltd., Beijing (CN); Beijing Zhi Ke Investment and Management Co., Ltd., Beijing (CN)

( * ) Notice: Subject to any disclaimer, the term of this patent is extended or adjusted under 35 U.S.C. 154(b) by 63 days.

(21) Appl. No.: 15/303,469

(22) PCT Filed: Oct. 23, 2014

(86) PCT No.: PCT/CN2014/089314
§ 371 (c)(1),
(2) Date: Oct. 11, 2016

(87) PCT Pub. No.: WO2015/154430
PCT Pub. Date: Oct. 15, 2015

(65) Prior Publication Data
US 2017/0037793 A1     Feb. 9, 2017

(30) Foreign Application Priority Data

Apr. 10, 2014   (CN) .......................... 2014 1 0142508

(51) Int. Cl.
*F02D 41/00*   (2006.01)
*F02B 63/04*   (2006.01)
(Continued)

(52) U.S. Cl.
CPC .......... *F02D 41/0002* (2013.01); *F02B 63/04* (2013.01); *F02M 35/024* (2013.01);
(Continued)

(58) Field of Classification Search
CPC .. F02M 26/08; F02M 26/10; F02M 35/10229; F02M 35/10163;
(Continued)

(56) References Cited

U.S. PATENT DOCUMENTS 4,169,354 A * 10/1979 Woollenweber .......... F01N 5/04
                                                              417/380
4,617,799 A * 10/1986 Todokoro ................ F01D 17/18
                                                              415/151
(Continued)

FOREIGN PATENT DOCUMENTS

CN      202255712 U    5/2012
CN      203248230 U   10/2013
(Continued)

OTHER PUBLICATIONS

International Search Report issued in International application No. PCT/CN2014/089314, dated Jan. 14, 2015.

*Primary Examiner* — Long T Tran
(74) *Attorney, Agent, or Firm* — Sean D. Detweiler, Esq.; Morse, Barnes-Brown & Pendleton, P.C.

(57) ABSTRACT

Disclosed is an apparatus for using negative pressure energy of an engine, comprising: a first cavity (10), which first cavity (10) is in communication with the atmosphere via a first intake port (20); a second cavity (30), which second cavity (30) is in communication with the intake port of the engine (50) for supplying air to the intake port of the engine; a second intake port (40), which second intake port (40) is connected to the second cavity (30), wherein when the second intake port (40) is open, the second cavity (30) is in communication with the atmosphere for supplying the air to the intake port of the engine; and a rotating device (60), which rotating device (60) is located between the first cavity (10) and the second cavity (30), and can be rotated under the action of pressure difference between the first cavity (10)
(Continued)

and the second cavity (30). Further disclosed is a method for using negative pressure energy of an engine. The apparatus and method for using the negative pressure energy of an engine is able to better cooperate with other parts of the vehicle while efficiently using energy.

11 Claims, 1 Drawing Sheet

(51) Int. Cl.
*F02M 35/024* (2006.01)
*F02M 35/10* (2006.01)
*F02D 9/02* (2006.01)

(52) U.S. Cl.
CPC ..... *F02M 35/10255* (2013.01); *F02M 35/10268* (2013.01); *F02D 2009/0283* (2013.01); *F02D 2200/021* (2013.01); *F02D 2200/50* (2013.01); *F02D 2200/503* (2013.01); *F02D 2250/41* (2013.01); *Y02T 10/42* (2013.01)

(58) Field of Classification Search
CPC .............. F02M 35/10144; F02M 26/60; F02B 29/0406; F02B 31/08
See application file for complete search history.

(56) References Cited

U.S. PATENT DOCUMENTS

| | | | | |
|---|---|---|---|---|
| 6,378,307 | B1* | 4/2002 | Fledersbacher | F02B 37/10 123/559.1 |
| 7,665,302 | B2* | 2/2010 | Nemeth | F02B 21/00 60/605.1 |
| 8,261,549 | B2* | 9/2012 | Kardos | F02B 29/0425 60/605.2 |
| 8,434,305 | B2* | 5/2013 | Donkin | F02B 21/00 123/559.1 |
| 2008/0066467 | A1* | 3/2008 | Nemeth | F02B 21/00 60/606 |
| 2014/0224225 | A1* | 8/2014 | Kragh | F02M 25/0836 123/520 |

FOREIGN PATENT DOCUMENTS

| | | |
|---|---|---|
| JP | 02291426 A | 12/1990 |
| JP | 0681669 A | 3/1994 |
| WO | WO 2015/154430 A1 | 10/2015 |

* cited by examiner

APPARATUS AND METHOD FOR USING NEGATIVE PRESSURE ENERGY OF ENGINE

CROSS-REFERENCE TO RELATED APPLICATIONS

This application is a national stage filing under 35 U.S.C. 371 of International Application No. PCT/CN2014/089314, filed Oct. 23, 2014, which claims priority to CN 201410142508.5, filed Apr. 10, 2014. The entire teachings of the above PCT Application No. PCT/CN2014/089314 is incorporated herein by reference.

TECHNICAL FIELD

The present invention relates to the field of engines and, more particularly, to an apparatus and method for using negative pressure energy of engine.

BACKGROUND OF THE INVENTION

With the development of the automobile industry, energy shortage and environmental pollution is a growing concern. The manufacturers and research institutions have been committed to effectively use energy in the operation of vehicles, especially the recycling of energy. Converting the kinetic energy into electrical energy is the mainstream research and development direction, but because of low efficiency of the conversion the result is always unsatisfactory. At the same time, the research on the conversion of potential energy into kinetic energy has been neglected. Although the negative pressure energy generated in the engine suction process is utilize the in prior art, the magnitude of this energy can only be controlled by changing the power of the engine. So this potential energy is not used conveniently and efficiently.

SUMMARY OF THE INVENTION

An object of the present invention is to provide an apparatus and method for using negative pressure energy of engine, and to effectively control the negative pressure generated when the engine is operated.

According to an aspect of the present invention, there is provided an engine negative pressure energy utilization apparatus, comprising: a first cavity, communicated with the atmosphere through a first air inlet; a second cavity, communicated with an engine intake port; a second air inlet, communicated with the second cavity, wherein when the second air inlet is opened, the second cavity communicates with the atmosphere; and a rotating device, positioned between the first cavity and the second cavity, and capable of rotating under the action of a pressure difference between the first cavity and the second cavity.

Preferably, the apparatus may further comprise an air filter located between the second inlet port and the engine intake port, and/or an air filter located between the first air inlet and the rotating device.

Preferably, the rotating device may comprise: a housing, seamlessly connected to a cavity wall of the first cavity and a cavity wall of the second cavity; a rotary shaft, located at a central position of the housing; and a turbine, separating the first cavity and the second cavity.

Preferably, the rotating device may be used for driving a fan or a generator.

Preferably, the apparatus may further comprise a controller for controlling the opening and closing or opening degree of the second air inlet.

Preferably, the apparatus may further comprises a temperature sensor for measuring the temperature of the engine and being connected to the controller, wherein the controller closes the second air inlet or decreases the opening degree of the second air inlet, when the temperature of the engine is higher than or equal to a predetermined value of temperature; and the controller opens the second air inlet or increases the opening degree of the second air inlet, when the temperature of the engine is lower than the predetermined value of temperature.

Preferably, the controller may acquires a state of charge of the battery, the controller closes the second air inlet or decreases the opening degree of the second air inlet, when the electric energy of the battery is lower than or equal to a predetermined value of electric energy; and the controller opens the second air inlet or increases the opening degree of the second air inlet, when the electric energy of the battery is greater than the predetermined value of the electric energy.

According to another aspect of the present invention, there is provided an engine negative pressure energy utilization method comprising, providing a first cavity that communicates with the atmosphere through a first air inlet; providing a second cavity that communicates with an engine intake port, wherein the first cavity communicates with the second cavity for supplying air to the engine intake port, the second cavity communicates with the atmosphere through a second air inlet, for supplying air to the engine intake port when the second air inlet is opened, providing a rotating device between the first cavity and the second cavity, wherein the rotating device is capable of rotating under a pressure difference between the first cavity and the second cavity; and controlling the pressure difference between the first cavity and the second cavity, by controlling the opening and closing or opening degree of the second air inlet.

Preferably, the method may further comprise: measuring the temperature of the engine; closing the second air inlet or decreasing the opening degree of the second air inlet, when the temperature of the engine is higher than or equal to a predetermined value of temperature; and opening the second air inlet or increasing the opening degree of the second air inlet, when the temperature of the engine is lower than the predetermined value of temperature.

Preferably, the method may further comprise: closing the second air inlet or decreasing the opening degree of the second air inlet, when the electric energy of the battery is lower than or equal to a predetermined value of electric energy; and opening the second air inlet or increasing the opening degree of the second air inlet, when the electric energy of the battery is greater than the predetermined value of electric energy.

The engine negative pressure energy utilization apparatus and method of the invention can utilize the negative pressure, generated when the engine operates, to drive the rotation of the equipment such as the electric fan and the generator, and can adjust the rotational speed of the electric fan or the power of the generator according to the real-time condition of the vehicle via the controller, so as to use energy effectively and to better meet the work of other parts of the vehicle.

DESCRIPTION OF REFERENCE NUMERALS

| 10 first cavity | 20 first air inle |
|---|---|
| 30 second cavity | 40 Second air inet |
| 50 engine | 60 rotating device |
| 70 controller | 81, 82 air filter |

DETAILED DESCRIPTION OF THE PREFERRED EMBODIMENT

The invention will now be described in detail, with reference to the drawings.

Figure 1:
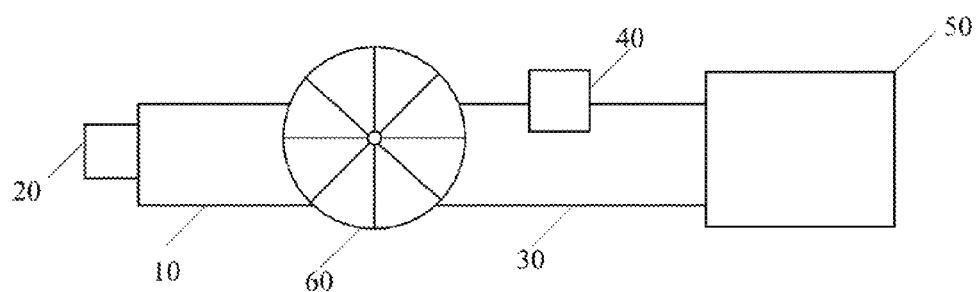
FIG. 1 is a schematic structural view of an engine negative pressure energy utilization apparatus of the present invention.
Figure 2:
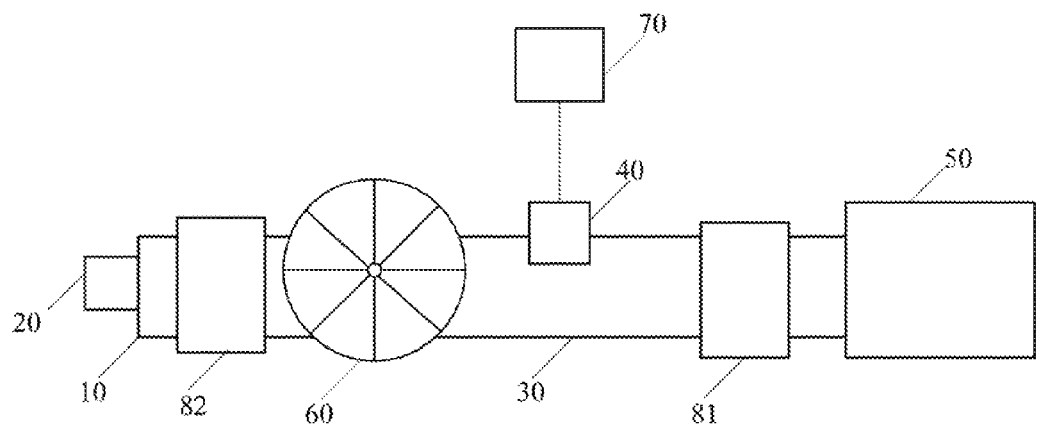
FIG. 2 is a schematic structural view of an engine negative pressure energy utilization apparatus according to a preferred embodiment of the present invention.

Refer to FIG. 1, the present invention provides an engine negative pressure energy utilization apparatus. The apparatus comprises: a first cavity 10 communicated with the atmosphere through a first air inlet 20; a second cavity 30 communicated with an intake port of the engine 50; a second air inlet 40 connected to the second cavity 30, wherein when the second air inlet 40 is opened, the second cavity 30 is in communication with the atmosphere, and a rotating device 60 located between the first cavity 10 and the second cavity 30 and capable of rotating under the action of a pressure difference between the first cavity 10 and the second cavity 30, The pressure difference between the first cavity 10 and the second cavity 30, can be gradually balanced when the rotating device 60 is rotated. That is, the rotational speed of the rotating device 60 will gradually become stable and corresponding to the pressure difference between the first cavity 10 and the second cavity 30. For example, when the pressure difference is stable and the rotational resistance or the load of the rotating device 60 is stable, the rotating device 60 will be at a stable rotational speed. Thereby, the rotating device 60 outputs a stable power to drive related devices. Thus, the negative pressure energy regarding intake of the engine is utilized.

In one embodiment, the rotating device 60 mainly comprises a housing, a rotary shaft and a turbine. The housing is seamlessly connected to the cavity wall of the first cavity 10 and the cavity wall of the second cavity 30; the rotary shaft is located at the center the housing; and the turbine separates the first cavity 10 and the second cavity 30.

When the engine 50 is operated, a negative pressure lower than the atmospheric pressure is generated at the intake port thereof, so that the air pressure in the second cavity 30 (communicating with the intake port of the engine 50) is lower than the atmospheric pressure. At the same time, the first cavity 10 communicates with the atmospheric pressure through the first air net 20, so that the air pressure in the first cavity 10 is the atmospheric pressure. At this time, there is a pressure difference across the rotating device 60 that is located between the first cavity 10 and the second cavity 30, so that the turbine separating the first cavity 10 and the second cavity 30 is subjected to the pressure difference and would be rotated, and drives the rotary shaft. That is, the rotating device 60 can convert the potential energy generated because of the running of the engine 50 into kinetic energy of the turbine and the rotary shaft.

In general, the rotational speed of the turbine of the rotating device 60 is related only to the operating power of the engine, however the present invention adjusts the opening of the second air inlet 40 and the magnitude of the negative pressure in the second cavity 30, so as to adjust the rotational speed of the rotating device 60. [

According to a preferred embodiment of the present invention, a controller 70 connected to the second air inlet 40 may be provided for controlling the opening of the second air inlet 40 by controlling the valve of the second air inlet 40 (opened, closed or a state therebetween), thereby controlling the value of intake air of the second air inlet 40 per unit time, and adjusting the magnitude of the air pressure in the second cavity 30, so as to control the rotational speed of the turbine of the rotating device 60. The controller 70 may be connected to other components of the vehicle, via a CAN bus and so on, to control the valve of the second air inlet 40 in accordance with the particular components condition or actual demand.

For example, when the operator desires to lower the rotational speed of the turbine of the rotating device 60, the controller 70 may be used to increase the opening degree of the valve of the second inlet 40, allowing more air to enter the second cavity 30 to reduce the pressure difference between the second cavity 30 and the standard atmospheric pressure, thereby reducing the turbine speed of the rotating device 60. In contrast, if the operator wishes to increase the turbine speed of the rotating device 60, the controller 70 may be used to close the valve of the second inlet port 40 or to reduce the opening degree of the valve.

According to a preferred embodiment of the present invention, in order to utilize this kinetic energy converted from the potential energy, the drive shaft of a fan can be connected to the rotary shaft of the rotating device 60, to rotate the fan using the rotary shaft of the rotating device 60, so as to cool the engine.

Preferably, the negative pressure energy utilization apparatus according to another preferred embodiment may further include a temperature sensor connected to the controller 70 for measuring the temperature of the engine 50. The controller sends out control signals to close the second air inlet or to decrease the opening degree of the second air inlet, when the temperature sensor detects a temperature of the engine higher than a predetermined value of temperature.

In the preferred embodiments, the optimum operating temperature of the engine may be determined based on various factors such as the engine type, the engine displacement, etc., so as to set the predetermined value of temperature. For example, the predetermined value of temperature may be set at 80-100 degrees Celsius. When the temperature of the engine 50 is higher than 100 degrees Celsius, the engine 50 is not at the optimum operating temperature, and a fan is required to operate to cool it. In one embodiment, the temperature sensor sends the detected temperature signal of the engine 50 to the controller 70. The controller 70 judges whether or not the temperature is greater than the predetermined value of temperature, if yes, the controller controls and closes the valve of the second air inlet 40 or reduces the opening degree of second air inlet 40. The pressure difference between the two cavities 30 and the first cavity 10 thus increases, and the turbine speed of the rotating device 60 is increased, thereby increasing the rotational speed of the fan.

Alternatively, the temperature sensor sends the measured temperature value of the engine 50 to a digital-to-analog converter that sends a high-level signal to the controller 70 when the temperature value is greater than or equal to a predetermined value of temperature; or a low-level signal, when the temperature value of the engine 50 is less than the predetermined value of temperature. Upon the reception of the high-level signal, the controller 70 controls and closes the valve of the second air inlet 40 or decreases the opening degree of the valve of the second air inlet 40.

In addition, according to another preferred embodiment of the invention, the rotating device 60 may be used to drive a generator, so as to charge a battery.

Preferably, the controller 70 may be directly connected to the control circuitry of the battery and receive a signal indicative of the energy (state of charge) from the control circuitry of the battery. Alternatively, the controller can obtain the information through a CAN bus. The controller 70 closes the valve of the second air inlet 40 or reduces the opening degree of the second air inlet 40 when the energy of the battery is too low, for example, lower than a predetermined value of electric energy, to increase the rotational speed of the turbine, in order to increase the differential pressure between the second cavity 30 and the first cavity 10, for increasing the speed of the turbine to charge the battery.

In accordance with a preferred embodiment, the engine negative pressure utilization device may further include an air filter 81 and/or 82 located between the second air inlet 40 and the engine 50, and/or between the first air inlet 20 and the rotating device 60, for filtering out impurities in the air that will enter the engine 50 and/or the rotating device 60, so as to prevent wear of the engine 50 and/or the rotating device 60.

According to a still another aspect of the present invention, there is provided an engine negative pressure energy utilization method. The method comprises: S1, providing a first cavity 10 communicating with the atmosphere through a first air inlet 20; S2, providing a second cavity 30 communicating with the intake port of the engine 50 and communicating with the atmosphere through the second air inlet 40; S3, providing rotating device 6 between the first cavity 10 and the second cavity 30, wherein the rotating device 60 is able to rotate under the effect of a pressure difference between the first cavity 10 and the second cavity 30; and S4, controlling the pressure difference between the first cavity 10 and the second cavity 30 by controlling the opening, closing or opening degree of the second air inlet 40. The pressure difference between the first cavity 10 and the second cavity 30, can be gradually balanced when the rotating device 60 is rotated. That is, the rotational speed of the rotating device 60 will gradually become stable and corresponding to the pressure difference between the first cavity 10 and the second cavity 30. For example, when the pressure difference is stable and the rotational resistance or the load of the rotating device 60 is stable, the rotating device 60 will be at a stable rotational speed. Thereby, the rotating device 60 outputs a stable power to drive related devices.

The engine negative pressure energy utilization method according to the preferred embodiment of the present invention may further include: S51, measuring the temperature of the engine 50; and S61, controlling and closing the second air inlet 40 or decreasing the opening degree of the second air inlet 40 when the temperature of the engine 50 is higher than or equal to a predetermined value of temperature; and controlling and opening the second air inlet 40 or increasing the opening degree of the second air inlet 40 when the temperature of the engine 50 is lower than the predetermined value of temperature.

Herein, the above-described method may be cyclically executed for a certain period of time. For example, when it is detected that the temperature of the engine 50 is too high, the valve of the second air inlet 40 can be closed to accelerate the fan speed to cool the engine 50. For example, ten minutes later, the temperature of the engine 50 is measured again, the valve of the second air inlet can be controlled to partially opened, to reduce the rotational speed of the fan, in order to prevent the operating temperature of the engine 50 from being too low.

The method according to the preferred embodiment may further include: S52, measuring the electric energy of the battery; S62, closing the second air inlet 40 or reducing the opening degree of the second air inlet 40 when the electric energy of the battery is lower than the predetermined value of the electric energy; and S7, using the rotating device 60 to drive the generator to supply power to the battery.

Although the embodiments in which the rotary apparatus 60 is applied as a fan or a generator are described, the application of the rotating device according to the present invention is not limited thereto. Those skilled in the art will be able to make various modifications or combinations of the functions of the rotating device in accordance with the concept of negative pressure utilization of the present invention.

The engine negative pressure energy utilization apparatus and method provided by the invention can utilize the negative pressure, generated when the engine operates, to drive the rotation of the equipment such as the electric fan and the generator, and can adjust the rotational speed of the electric fan or generator power according to the real-time condition of the vehicle via the controller, so as to use energy effectively and to better meet the work of other parts of the vehicle.

While the preferred embodiments of the present invention have been described in detail with reference to the accompanying drawings, the present invention is not limited to the details of the above embodiments, but on the contrary, within the scope of the technical idea of the present invention, simple variations are available and they are within the scope of the present invention.

In addition, it is to be understood that, in the case of non-conflict, the specific technical features described in the above embodiments may be combined in any suitable manner. In order to avoid unnecessary repetition, various possible combinations will not be described in the present invention.

In addition, any combination of the various embodiments of the present invention may be employed as long as it does not depart from the idea of the present invention and is equally deemed to be a part of the disclosure of the present invention.

The invention claimed is:

1. An engine negative pressure energy utilization apparatus, comprising:
   a first cavity, in atmospheric communication through a first air inlet;
   a second cavity, in communication with an engine intake port, wherein the first cavity is in communication with the second cavity, for supplying air to the engine intake port;
   a second air inlet, in communication with the second cavity, wherein when the second air inlet is opened, the second cavity communicates with the atmosphere, for supplying air to the engine; and
   a rotating device, positioned between the first cavity and the second cavity, and capable of rotating under the action of a pressure difference between the first cavity and the second cavity.

2. The engine negative pressure energy utilization apparatus according to claim 1, further comprising an air filter located between the second inlet port and the engine intake port, and/or an air filter located between the first air inlet and the rotating device.

3. The engine negative pressure energy utilization apparatus according to claim 1, wherein the rotating device comprises:
   a housing, seamlessly connected to a cavity wall of the first cavity and a cavity wall of the second cavity;
   a rotary shaft, located at a central position of the housing; and
   a turbine, separating the first cavity and the second cavity.

4. The engine negative pressure energy utilization apparatus according to claim 3, further comprising a controller, for controlling an opening, closing or opening degree of the second air inlet.

5. The engine negative pressure energy utilization apparatus according to claim 4, further comprising:
   a temperature sensor, for measuring a temperature of the engine and being connected to the controller,
   wherein the controller closes the second air inlet or decreases the opening degree of the second air inlet, when the temperature of the engine is higher than or equal to a predetermined value of temperature; and
   the controller opens the second air inlet or increases the opening degree of the second air inlet, when the temperature of the engine is lower than the predetermined value of temperature.

6. The engine negative pressure energy utilization apparatus according to claim 4, wherein the controller acquires a state of charge of a battery,
   the controller closes the second air inlet or decreases the opening degree of the second air inlet, when an electric energy of the battery is lower than or equal to a predetermined value of electric energy; and
   the controller opens the second air inlet or increases the opening degree of the second air inlet, when the electric energy of the battery is greater than the predetermined value of the electric energy.

7. The engine negative pressure energy utilization apparatus according to claim 1, wherein the rotating device is used for driving a fan or a generator.

8. The engine negative pressure energy utilization apparatus according to claim 7, further comprising a controller, for controlling an opening, closing or opening degree of the second air inlet.

9. An engine negative pressure energy utilization method, comprising:
   providing a first cavity that communicates with an atmosphere through a first air inlet;
   providing a second cavity that communicates with an engine intake port, wherein the first cavity communicates with the second cavity for supplying air to the engine intake port, the second cavity communicates with the atmosphere through a second air inlet, for supplying air to the engine intake port when the second air inlet is opened,
   providing a rotating device between the first cavity and the second cavity, wherein the rotating device is capable of rotating under a pressure difference between the first cavity and the second cavity; and
   controlling the pressure difference between the first cavity and the second cavity, by controlling an opening, closing or opening degree of the second air inlet.

10. The engine negative pressure energy utilization method according to claim 9, further comprising:
    measuring a temperature of the engine;
    closing the second air inlet or decreasing the opening degree of the second air inlet, when the temperature of the engine is higher than or equal to a predetermined value of temperature; and
    opening the second air inlet or increasing the opening degree of the second air inlet, when the temperature of the engine is lower than the predetermined value of temperature.

11. The engine negative pressure energy utilization method according to claim 9, further comprising:
    closing the second air inlet or decreasing the opening degree of the second air inlet, when an electric energy of a battery is lower than or equal to a predetermined value of electric energy; and
    opening the second air inlet or increasing the opening degree of the second air inlet, when the electric energy of the battery is greater than the predetermined value of electric energy.

* * * * *